United States Patent Office

3,026,211
Patented Mar. 20, 1962

3,026,211
CALCIUM OXIDE REFRACTORY AND PROCESS OF PRODUCING SAME
Ivan B. Cutler, Salt Lake City, Utah, assignor to Virgil F. Ostler, Salt Lake City, Utah
No Drawing. Filed Feb. 6, 1959, Ser. No. 791,519
3 Claims. (Cl. 106—58)

This invention relates to basic refractory materials and to processes of producing them. It is concerned particularly with providing a practical calcium oxide refractory.

Basic refractories, such as magnesite and dolomite bricks, have found wide use in industry. They would be used even more extensively than they are at present were it not for the fact that the raw materials employed to produce them are considerably more costly than those used in the production of acid refractories, such as silica brick and fire clay.

Calcium oxide is a basic material offering attractive possibilities, costwise, for the production of a basic refractory. Thus, abundant supplies of limestone, which is readily convertible to calcium oxide, are available throughout the world. However, calcium oxide has a strong tendency to hydrate, and, in the presence of water vapor, to change to calcium hydroxide. This change is accompanied by a large increase in volume, which has a destructive effect on bricks and other refractory products made from calcium oxide in accordance with known methods.

A principal object of the present invention is to provide a process for producing a calcium oxide refractory having exceptionally high density and being subject to practically no hydration nor volume increase, even under conditions of great humidity.

An outstanding feature of the process is the sintering of a compact of calcium oxide powder derived from calcium hydroxide, rather than directly from calcium carbonate.

A feature of the product is its great density, from approximately 87% to approximately 96% of the theoretical, and the presence of an exceedingly thin and protective film of calcium hydroxide over its external surfaces. The product is further characterized by being almost entirely inert to moisture, experiencing practically no change of volume nor absorption of moisture even when submerged in water for several hours.

Further objects and features of the invention will become apparent from the following detailed description of preferred practice of the process.

The process requires a calcium oxide powder derived from calcium hydroxide, which latter is advantageously produced in accordance with well known practice. Thus, calcium carbonate rock or some other form of calcium carbonate, such as oyster shells, is burned in a lime kiln to produce lime, which is slaked by the addition of water to produce a calcium hydroxide in the form of a fine powder.

The calcium hydroxide powder is converted back to the oxide by subjecting it to heat of from about 700° C. to 1000° C. This operation may be carried out in any calcining furnace, precautions being taken to avoid contact with moisture or $CO_2$ so far as is practical.

The resulting calcium oxide powder is naturally of suitable size for sintering e.g. from one to ten microns, and may be stored under sealed conditions, for example, in moisture-proof bags, barrels, etc., away from a carbon dioxide atmosphere until used, or it may be passed directly to the compacting operation, care being taken to keep it free of contact with moisture and carbon dioxide while so doing.

The calcium oxide powder is mixed with a suitable binder, such as a wax or gum ordinarily used in preparing a compact for sintering, and is subjected to compaction in a mold and by use of a press which may be of conventional type. Compaction should be under pressure no less than about one ton per square inch, the density of the resulting compact being from about 1.6 to 2.5 grams per cubic centimeter..

Protection from moisture and $CO_2$ may be obtained to a practical extent throughout the several operations by maintaining a clean room atmosphere of humidity no higher than about 0.002 lb. of water per pound of dry air.

Satisfactory sintering temperatures applied to the compact will range from approximately 1400° C. to approximately 1600° C., depending upon the degree of compaction, the higher temperatures being generally required to produce a satisfactory product from the compacts of lower density. Under some conditions, high density compacts may even be fired at a temperature as low as 1350° C. or thereabouts. Temperatures higher than 1600° C. may, of course, also be utilized so long as they do not exceed a sintering range.

The resulting product has a density of from about 2.9 to about 3.2 grams per cubic centimeter, which represents from about 87% to 96% of the theoretical density. It exhibits practically no tendency to absorb moisture, once a relatively thin protective film is formed over its exterior surface, and experiences practically no volumetric changes when exposed to highly humid atmosphere. It can be used in place of conventional basic refractory materials for most purposes. Being made from calcium carbonate, it represents a relatively low cost product.

The following examples represent typical laboratory procedure and results during testing:

*Example 1*

One hundred grams of a commercial calcium hydroxide powder, as slaked lime, were calcined at a temperature of 1000° C. in an electric laboratory furnace for 60 minutes, yielding a calcium oxide powder which was mixed with 10 grams of mineral oil as a binder and compacted in a steel die at a pressure of 15 tons per square inch. The resulting compact had a density of 2 grams per cubic centimeter. It was introduced into a gas fired sintering furnace and subjected to a temperature of 1400° C. for a period of 60 minutes. The final refractory product had a density of 3.12 grams/cc., which represents 94% of the theoretical. When submerged in water overnight, there was no significant gain in weight and no sign of disintegration, as would have been the case had there been any appreciable hydration. A thin film of calcium hydroxide covered its exposed surfaces.

*Example 2*

This test was carried out in the same manner, except for the sintering temperature which was raised to 1500° C. The resulting product had a density of 3.17 gram/cc., which represents 95% of the theoretical.

*Example 3*

As a test comparative with that of Example 2, above, a similar quantity of calcium carbonate was calcined at 1000° C. and sintered at 1500° C. The refractory product showed a density of only 2.37 grams/cc., which represents only 71% of the theoretical.

The temperature at which the calcium hydroxide is calcined to yield the calcium oxide sintering powder is not critical. The only significant difference is in the extent of shrinkage which it undergoes, the lower the calcining temperature the greater the shrinkage. As an example, the calcium hydroxide calcined at 1000° C. in Example 2, above, and sintered at 1500° C. had a linear shrinkage of 14.1%, while calcium hydroxide which was calcined at 900° C. and sintered at the same 1500° C. in another test had a shrinkage of 18.2% and a density of 3.06 grams. Similarly, calcium hydroxide calcined at 800° C. and sintered at 1500° C. in another test had a linear shrinkage of 20.4% and a density of 3.07 grams/cc.

The present process is applicable to various basic materials, such as dolomite, which contain calcium carbonate as a principal constituent. Thus, in the processing of dolomite, the raw rock is calcined to drive off the carbon dioxide from both the calcium carbonate and the magnesium carbonate. The resulting oxides are hydrated to form calcium hydroxide and magnesium hydroxide, and these hydroxides are then calcined to drive off the water. The oxides from this calcination are compacted and sintered as explained above to provide a final refractory product conforming to the invention.

Whereas this invention is here described with particular reference to presently preferred specific embodiments thereof, it should be understood that various changes may be made therein without departing from the generic inventive concepts.

I claim:

1. A process for producing a basic refractory material, comprising preparing a calcium oxide powder from calcium hydroxide by calcining the latter; preparing a sinterable compact from the calcium oxide powder in an atmosphere substantially free from moisture and carbon dioxide and under a pressure of at least substantially one ton per square inch; and sintering said compact at a temperature of from approximately 1400° C. to approximately 1600° C.

2. A process for producing a basic refractory material from limestone, comprising calcining the limestone to produce calcium oxide; hydrating said oxide; calcining the hydrated oxide; preparing a sinterable compact from the calcined hydrated oxide in an atmosphere substantially free from moisture and carbon dioxide and under a pressure of at least substantially one ton per square inch; and sintering said compact at a temperature of from approximately 1400° C. to approximately 1600° C.

3. A process for producing a basic refractory material from dolomite, comprising calcining the dolomite to drive off the $CO_2$; hydrating the calcined material; calcining the hydrated material to drive off the water; preparing a sinterable compact from the calcined hydrated material in an atmosphere substantially free from moisture and carbon dioxide and under a pressure of at least substantially one ton per square inch; and sintering said compact at a temperature of from approximately 1400° C. to approximately 1600° C.

References Cited in the file of this patent
UNITED STATES PATENTS

| | | |
|---|---|---|
| 2,876,122 | Whittemore | Mar. 3, 1959 |
| 2,948,631 | McAllister | Aug. 9, 1960 |